US007948554B2

(12) United States Patent
Goto et al.

(10) Patent No.: US 7,948,554 B2
(45) Date of Patent: *May 24, 2011

(54) MOBILE PHONE EQUIPPED WITH A CAMERA INCLUDING A FIRST ROTATION AXIS UNIT AND A SECOND ROTATION AXIS UNIT

(75) Inventors: Takao Goto, Tokyo (JP); Tetsuo In, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,658

(22) Filed: Jun. 30, 2009

(65) Prior Publication Data

US 2009/0270125 A1 Oct. 29, 2009

Related U.S. Application Data

(63) Continuation of application No. 10/569,580, filed as application No. PCT/JP2004/010647 on Jul. 27, 2004, now Pat. No. 7,646,417.

(30) Foreign Application Priority Data

Sep. 4, 2003 (JP) .................................. 2003-312823

(51) Int. Cl.
H04N 5/225 (2006.01)
G03B 29/00 (2006.01)
(52) U.S. Cl. ........................................ 348/373; 396/434
(58) Field of Classification Search .................. 348/373; 396/434
See application file for complete search history.

(56) References Cited

U.S. PATENT DOCUMENTS

| 6,798,429 | B2 * | 9/2004 | Bradski | 345/156 |
|---|---|---|---|---|
| 6,965,413 | B2 * | 11/2005 | Wada | 348/376 |
| 7,289,102 | B2 * | 10/2007 | Hinckley et al. | 345/156 |
| 2001/0004269 | A1 * | 6/2001 | Shibata et al. | 348/333.06 |
| 2003/0098847 | A1 | 5/2003 | Yamamoto | |
| 2003/0228847 | A1 * | 12/2003 | Matsumoto | 455/90.3 |
| 2004/0141085 | A1 * | 7/2004 | Nickel et al. | 348/333.11 |
| 2004/0201595 | A1 * | 10/2004 | Manchester | 345/649 |

FOREIGN PATENT DOCUMENTS

| JP | A 06-169418 | 6/1994 |
|---|---|---|
| JP | A 08-223492 | 8/1996 |

(Continued)

Primary Examiner — Lin Ye
Assistant Examiner — Chia-Wei A Chen
(74) Attorney, Agent, or Firm — Oliff & Berridge, PLC

(57) ABSTRACT

The present invention relates to a portable terminal in which the orientation of the displayed subject is the same as the actual orientation of the subject. The reference attitude when taking a picture is shown in FIG. 5, with the lid 12 being rotated substantially about 90 degrees about the X-axis with respect to the main body, and a perpendicular of the display 32 is in the same orientation as the optical axis of the CCD 41. In this attitude, the image captured by the CCD 41 is displayed as it is in the display 32. On the other hand, when the angle detector 51 detects that the lid 12 is rotated by a further 90 degrees with respect to the main body 11 from the attitude of FIG. 5 and the lid 12 and the main body 11 are opened by about 180 degrees, the image captured by the CCD 41 is rotated by 90 degrees, and the rotated image is displayed in the display 32. The present invention can be applied to portable type terminals such as mobile phones having a two axially rotatable structure, PDA, personal computers.

1 Claim, 13 Drawing Sheets

FOREIGN PATENT DOCUMENTS

| | | |
|---|---|---|
| JP | 2001-034182 A | 2/2001 |
| JP | A 2001-169166 | 6/2001 |
| JP | A 2002-135380 | 5/2002 |
| JP | A 2003-162277 | 6/2003 |

* cited by examiner

US 7,948,554 B2

MOBILE PHONE EQUIPPED WITH A CAMERA INCLUDING A FIRST ROTATION AXIS UNIT AND A SECOND ROTATION AXIS UNIT

PRIORITY

The present application is a continuation application of application Ser. No. 10/569,580 filed Feb. 28, 2006, which is a U.S. National Stage Application of PCT/JP2004/010647, filed Jul. 27, 2004, which claims priority from Japanese Patent Application No. 2003-312823, filed Sep. 4, 2003. The disclosure of each of the prior applications is hereby incorporated by reference in its entirety.

TECHNICAL FIELD

The present invention relates to a portable terminal, and more particularly to a portable terminal capable of matching the orientation of a displayed object with the actual orientation of the object.

BACKGROUND ART

In recent years mobile phones equipped with cameras including electronic elements such as charge coupled devices (CCD) have been spreading rapidly. Users have a need for higher quality photographs (still images) and video, so mobile terminals provided with CCDs exceeding one megapixel exist.

Also, from these circumstances mobile phones provided with a main body and a lid having a display such as a liquid crystal display (LCD) that can rotate in two axes that emphasize the photographing style with the camera as shown in FIG. 1 have been proposed and marketed.

FIG. 1 shows an external view of the front of a conventional mobile phone 1 with a camera. A main body 11 and lid 12 are formed so that they can rotate and fold about the X-axis via a first rotation axis unit 13. The first rotation axis unit 13 includes members 13a through 13c, of which members 13a and 13c are fixed to the main body 11, and only member 13b can rotate. The first rotation axis unit 13 (member 13b) is joined to the lid 12 via a cylindrical member forming a second rotation axis member 14, and the main body 11, the entire first rotation axis unit 13, and the lid 12 are formed so that they can rotate via the second rotation axis member 14 about the Y-axis which passes through the center of the second rotation axis member 14.

An operation key 21 that is operated to move a cursor displayed on a display 32 and confirm a selected item, a plurality of input buttons 22, and a microphone 23 are provided on the surface of the main body 11. A speaker 31, and a display formed from LCD or similar are provided on the surface of the lid 12. Within the first rotation axis unit 13 a CCD 41 is provided on the right side in the figure, and a lens 42 is provided on the left side in the figure. Therefore, when the user of the mobile phone 1 is taking a photograph, the left side in FIG. 1 is pointed towards the subject to be taken.

In this way, as the mobile phone has a structure that can rotate in two axes (X-axis, Y-axis) a user can take a photograph with the mobile phone in the manner shown in FIG. 2.

FIG. 2 is a view of the mobile phone 1 of FIG. 1 viewed from the right hand side, rotated by about 90 degrees about the X-axis via the first rotation axis unit 13 from the attitude in FIG. 1 (body 11 and lid 12 opened by about 180 degrees), and the lid 12 rotated relative to the main body 11 by about 90 degrees about the Y-axis via the second rotation axis member 14. In this way, the user can take photographs in the same way as a video camera, by holding the main body 11 in the right hand and aiming the lens 42 at the subject. At this time the image taken by the CCD 41 is displayed in the display 32.

Technology for displaying an image taken by a mobile phone provided with a rotatable camera, that reverses the image in the vertical direction according to the angle of rotation of the camera provided in the top of the housing is disclosed in Patent Document 1.

Patent Document 1: Japanese Patent Application Laid-open No. H 8-223492.

DISCLOSURE OF THE INVENTION

However, when a photograph is taken by a mobile phone 1 capable of rotating in two axes as shown in FIGS. 1 and 2, there is the problem that depending upon the rotation angle about the axis, the orientation of the subject displayed in the display 32 could be different from the actual orientation of the subject.

For example, when the mobile phone 1 in FIG. 2 is in the reference attitude for taking a photograph, the orientation of the image of a subject O displayed in the display 32 is the same as the actual orientation of the subject O as shown in FIG. 3A. In FIG. 3A, the subject O which is a cylindrical object is positioned in front of the optical axis of the CCD 41, and the image of the subject O is displayed in the display 32 in the same vertical and horizontal orientation.

On the other hand, if the attitude is set as shown in FIG. 3B, by rotating the lid 12 relative to the main body 11 about the X-axis by about 90 degrees, the image taken by the CCD 41 within the first rotation axis unit 13 is unchanged from the condition shown in FIG. 3A, so the orientation of the subject O displayed in the display 32 is also unchanged from the condition shown in FIG. 3A. In other words, the orientation of the subject O displayed in the display 32 becomes different from the actual orientation of the subject O (the right direction in the figure becomes the upper direction of the subject O displayed in the display 32).

When the lid 12 is rotated from the attitude in FIG. 3A by about 45 degrees relative to the main body 11 as shown in FIG. 3C, in the same way the orientation of the subject O displayed in the display 32 becomes different from the actual orientation of the subject O (the upper right direction in the figure becomes the upper direction of the subject O displayed in the display 32).

This means that if the positional relationship of the lid 12 and body 11 is not exactly orthogonal, the orientation of the subject displayed in the display 32 will be different from the actual orientation of the subject, and this will make it inconvenient for the user to confirm the attitude of the subject or picture composition by looking at the display 32.

Also, it is possible to consider solving this problem by for example turning the entire mobile phone 1 of FIG. 3B horizontal, or slanting the main body 11 in accordance with the angle between the main body 11 and the lid 12, but this would force the user to adopt an awkward attitude, and hinder free picture taking.

With the foregoing in view the present invention provides a mobile phone having a structure that can rotate about two axes in which regardless of the angle of rotation of the axis the orientation of the subject displayed is the same as the actual orientation of the subject.

A first portable terminal according to the present invention includes first rotation means that supports a lid and a main body pivotally; image taking means whose optical axis has the same orientation as the first rotation means; display means, provided on the lid, for displaying images taken by the image taking means; second rotation means that supports the lid pivotally with respect to the main body about an axis perpendicular to the axis of the first rotation means; detection means that measures the rotation angle of the first rotation means; and display control means that rotates the image taken by the image taking means according to the rotation angle measured by the detection means and displays the image in the display means.

A second portable terminal according to the present invention includes first rotation means that supports a lid and a main body pivotally; image taking means whose optical axis has the same orientation as the first rotation means; display means, provided on the lid, for displaying images taken by the image taking means; second rotation means that supports the lid pivotally with respect to the main body about an axis perpendicular to the rotation axis of the first rotation means; and linking means that rotates the image taking means in response to the rotation of the lid and the main body due to the first rotation means.

In the first portable terminal according to the present invention, the angle of rotation of the first rotation means is measured, and the image taken by the image taking means is rotated based upon the measured angle of rotation, and displayed in the display means.

In the second portable terminal according to the present invention, the image taking means is rotated in response to the rotation of the lid and the main body via the first rotation means.

According to the first and second present inventions, the orientation of the displayed subject can coincide with the actual orientation of the subject. Therefore, a user can accurately confirm the attitude of the subject at that time from the displayed image.

BEST MODE FOR CARRYING OUT THE INVENTION

Embodiment 1

Figure 1:
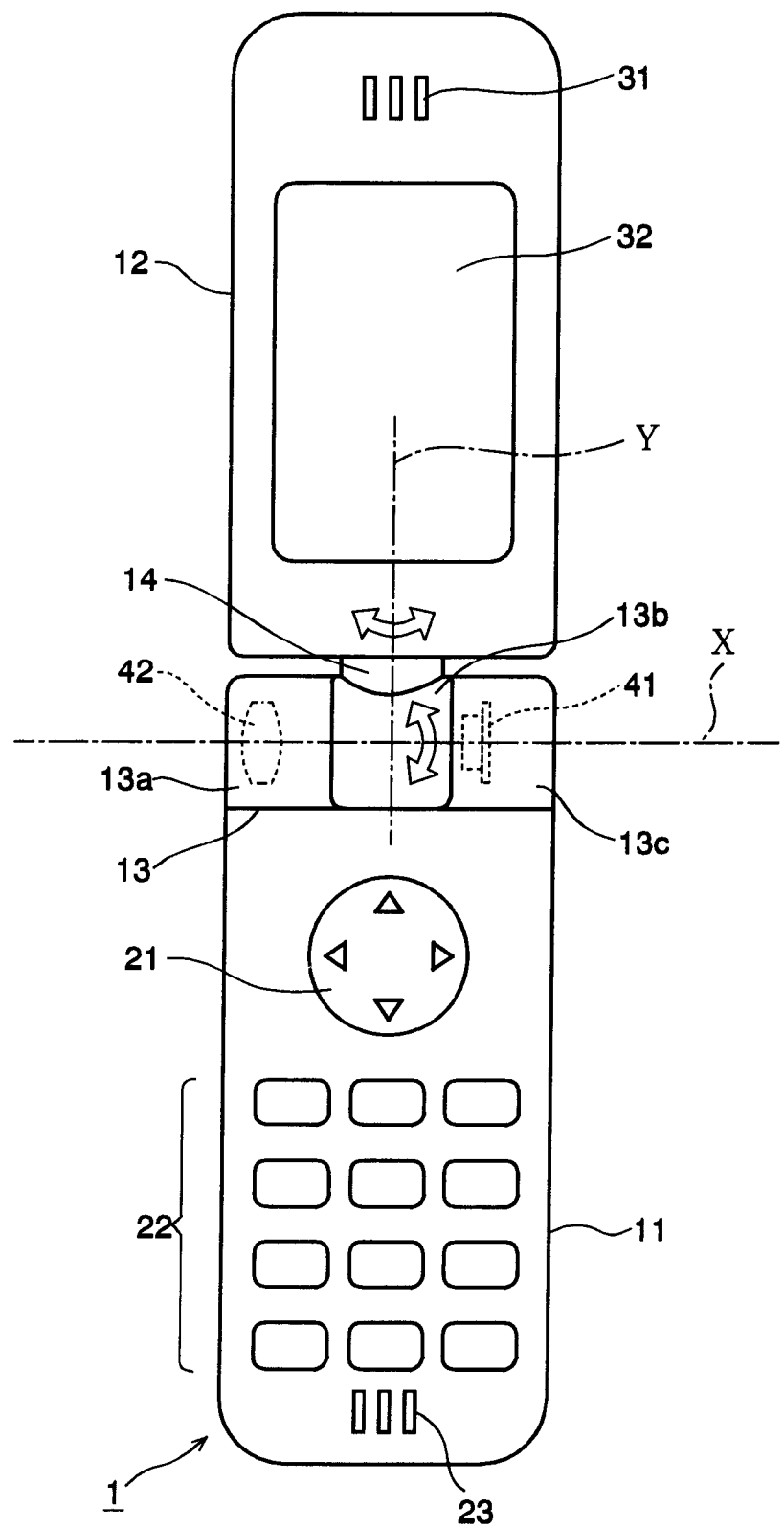
FIG. 1 shows an external view of the front of a conventional mobile phone.
Figure 2:
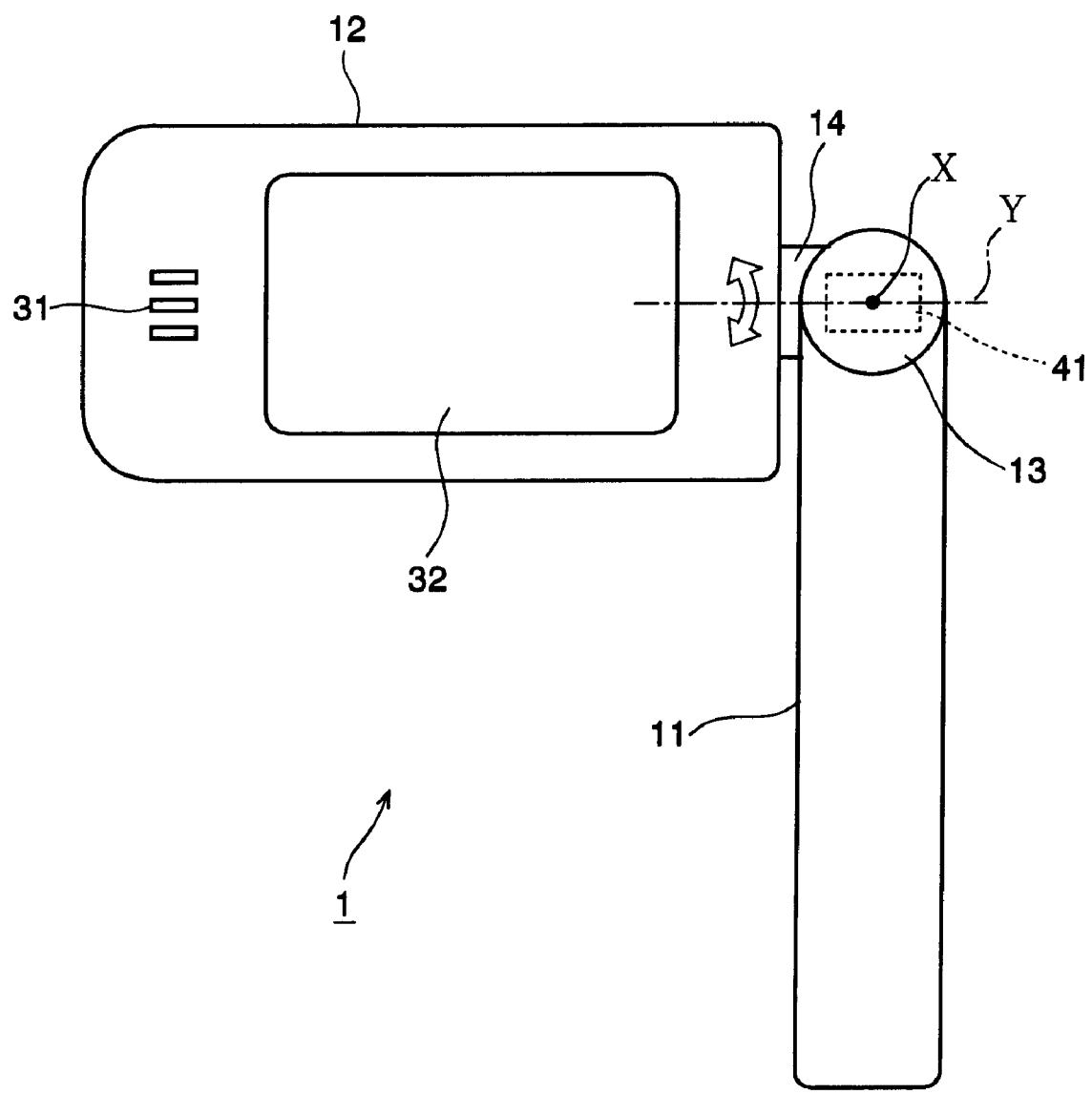
FIG. 2 shows a side view of the mobile phone of FIG. 1.
Figure 3A:
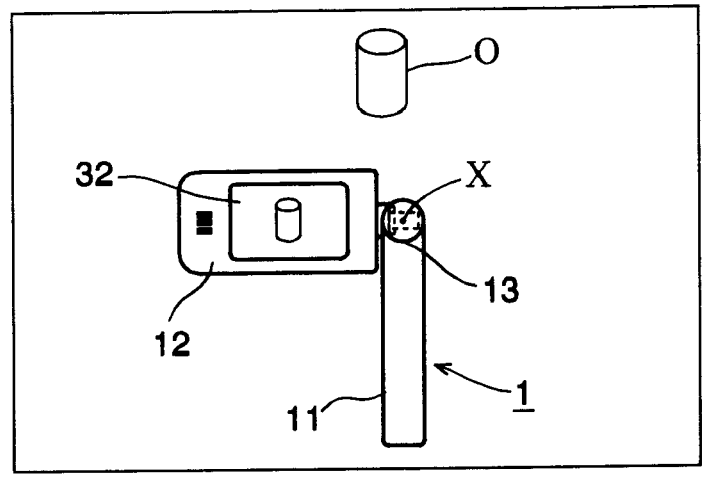
FIG. 3A shows an example of the display of an image taken by the mobile phone of FIG. 1.
Figure 3B:
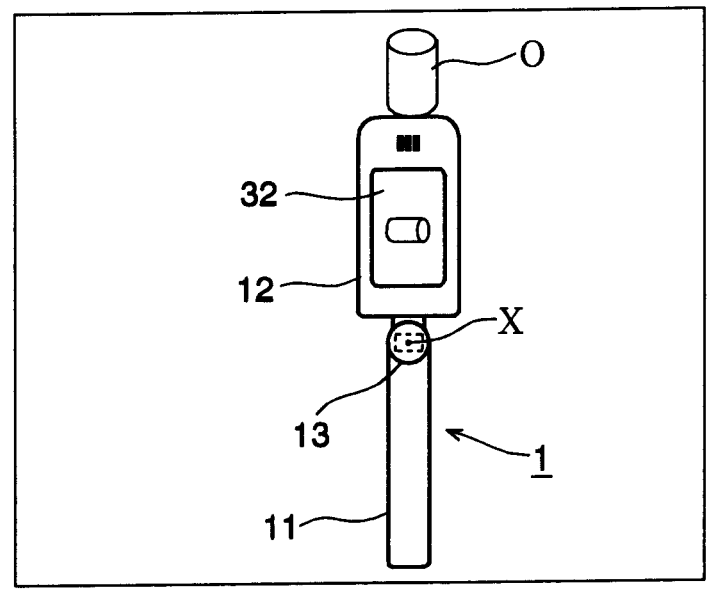
FIG. 3B shows an example of the display of an image taken by the mobile phone of FIG. 1.
Figure 3C:
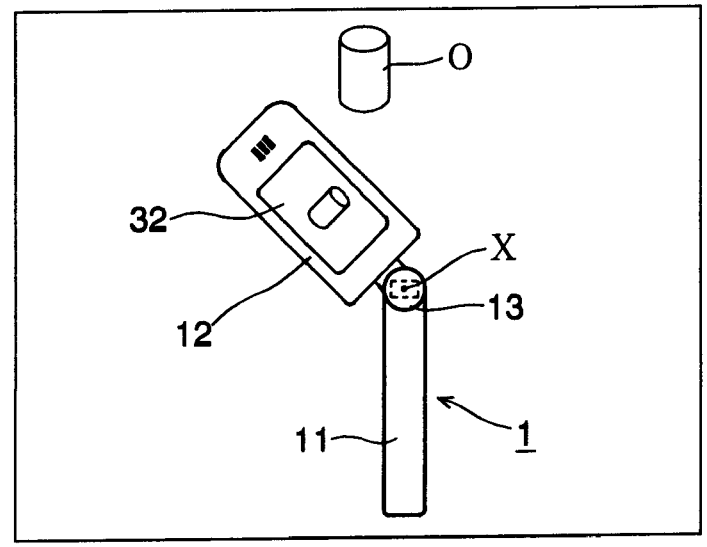
FIG. 3C shows an example of the display of an image taken by the mobile phone of FIG. 1.
Figure 4:
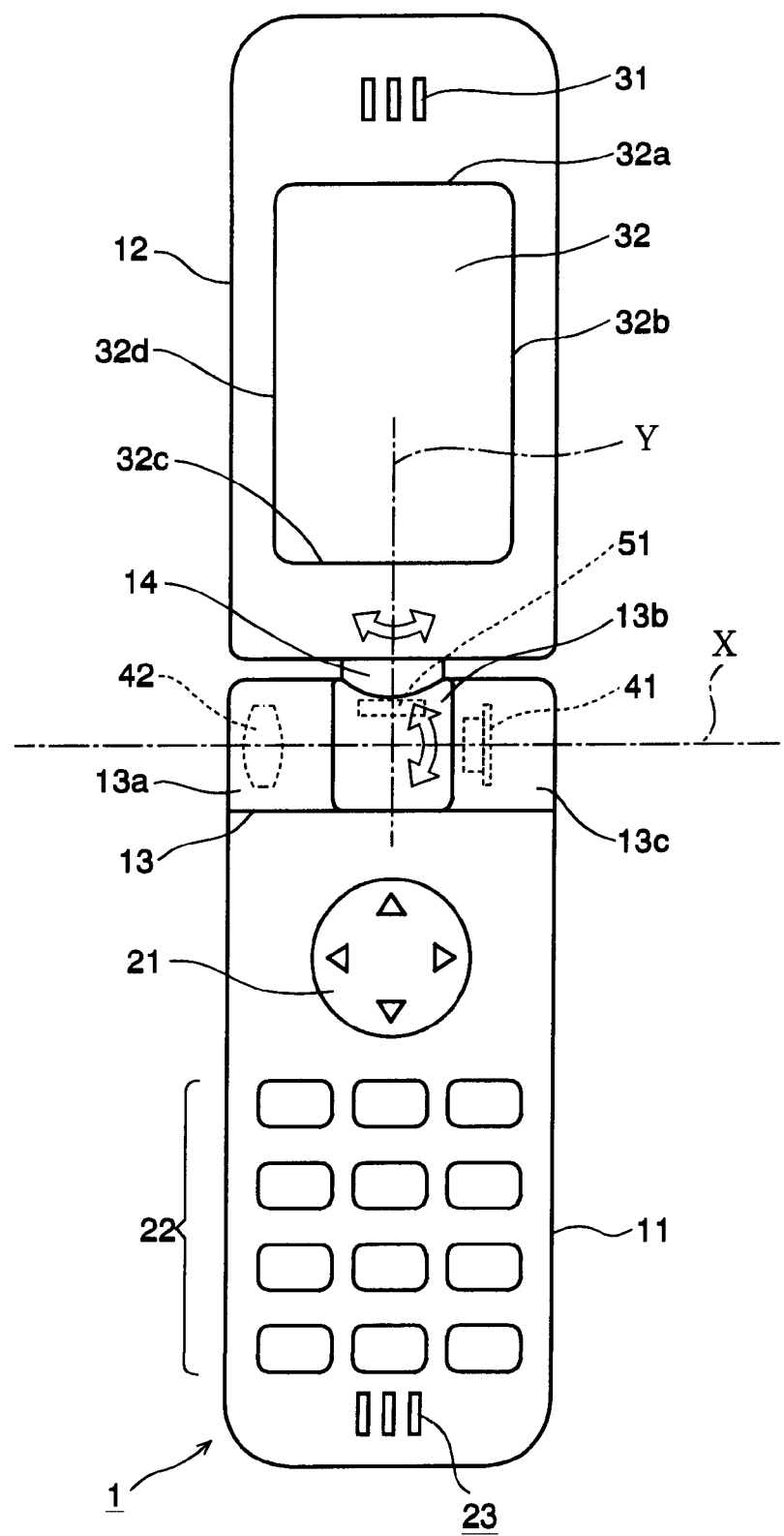
FIG. 4 shows an external view of the front of a mobile phone according to the present invention.

FIG. 4 shows an external view of the front of a mobile phone according to the present invention. Parts that are the same as FIG. 1 have been given the same label.

A main body 11 and a lid 12 are formed so that they can rotate and fold about the X-axis via a first rotation axis unit 13. The first rotation axis unit 13 includes members 13a through 13c, of which members 13a and 13c are fixed to the main body 11, and only member 13b which is rotatably fixed to these members can rotate about the X-axis. In other words, the main body 11 and the lid 12 open and close by rotation of the member 13b.

The first rotation axis unit 13 (member 13b) is joined to the lid 12 via a cylindrical member forming a second rotation axis member 14, and the main body 11, the entire first rotation axis unit 13, and the lid 12 are formed so that they can rotate via the second rotation axis member 14 about the Y-axis which passes through the center of the second rotation axis member 14. When either the second rotation axis member 14 and the member 13b are fixed and the second rotation axis member 14 and the lid 12 can rotate, or the second rotation axis member 14 and the member 13b can rotate and the second rotation axis member 14 and the lid 12 are fixed, the lid 12 can rotate relative to the main body 11 (the first rotation axis unit 13).

The surface of the main body 11 includes an operation key 21 that is used for moving a cursor displayed on a display 32 and confirming the selection of selected contents, and a plurality of input buttons 22 including numerical buttons [0] through [9] (numerical pad), a [*] button, and a [#] button. A user can create for example an electronic mail or a memo by operating the operation key 21 and the input buttons 22. A microphone 23 is provided below the input buttons 22 to pick up the voice of the user.

The surface of the lid 12 includes a speaker 31 that outputs voice and the display 32 formed from a liquid crystal display (LCD) or similar. On the display 32, for example, the reception status of radio waves, remaining battery power, names and telephone numbers registered in a telephone directory, as well as still photographs or video taken by the CCD 41 are displayed. As described later, the display orientation (display angle) of still photographs or video displayed in the display 32 is switched according to the rotation angle of the main body 11 and the lid 12 about the X-axis.

Within the first rotation axis unit 13, a lens 42 is provided on the left side, and a CCD 41 that takes the images of the subject produced by the lens 42 is provided on the right side. A hole is formed in front of the lens 42 which forms the left hand surface of the first rotation axis unit 13 (the left side on the figure), from which external light is focused by the lens 42. Also, an angle detector 51 that measures the angle of rotation of the main body 11 and the lid 12 about the X-axis is provided within the first rotation axis unit 13.

In this way, the optical axis of the CCD 41 is the same as the rotation axis of the first rotation axis unit 13, so the user of the mobile phone 1 aims the left side in FIG. 4 towards the subject when taking images. Specifically, the user takes images with the mobile phone 1 in the attitude shown in FIG. 5.

Figure 5:
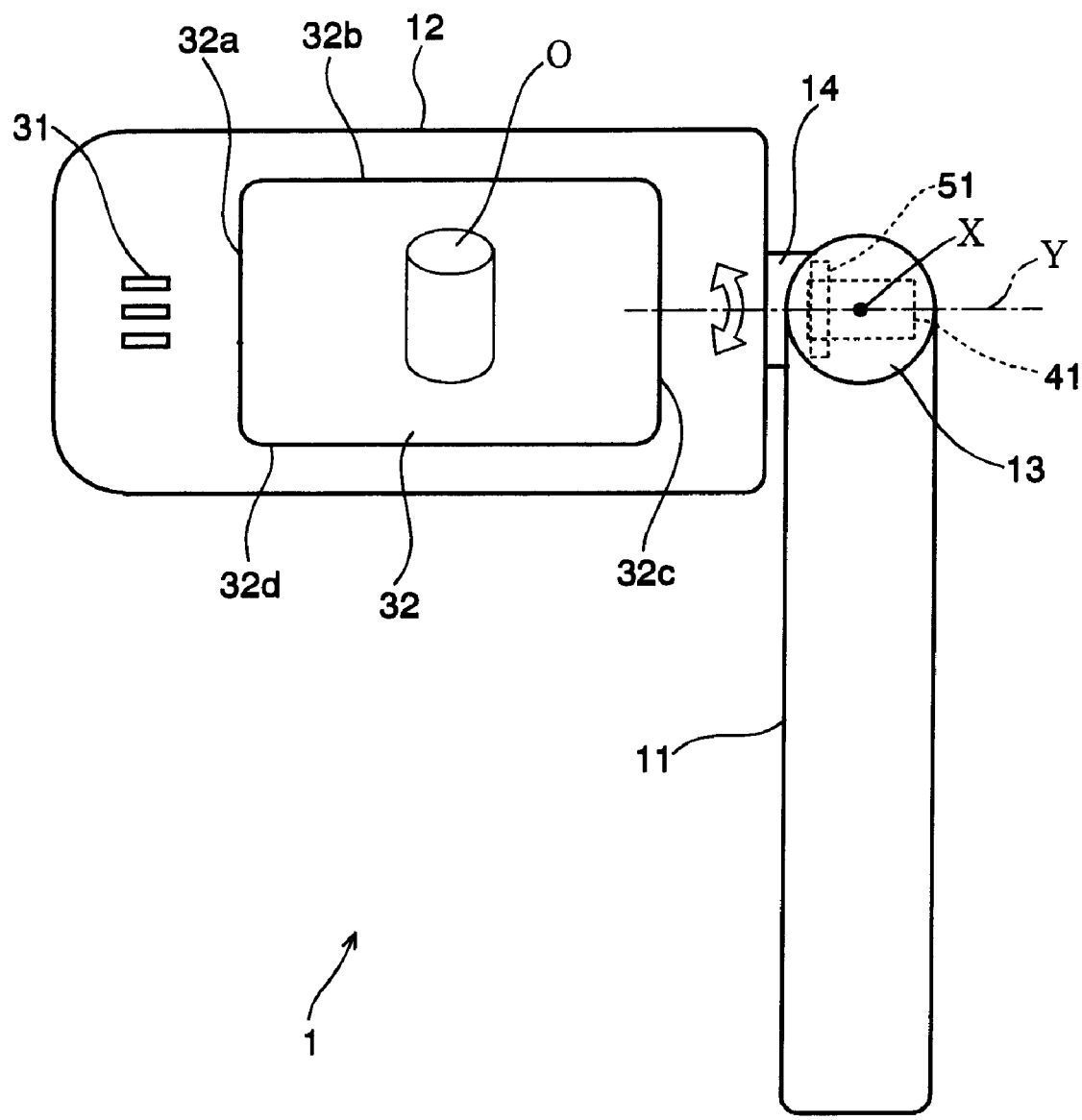
FIG. 5 is a side view of the mobile phone of FIG. 4.

FIG. 5 is a side view of the mobile phone 1 of FIG. 4 seen from the right hand side.

The attitude of the mobile phone 1 shown in FIG. 5 is that of the mobile phone 1 of FIG. 4 in which the main body 11 and the lid 12 are opened by about 180 degrees, with the lid 12 rotated by about 90 degrees about the X-axis relative to the main body 11, and rotated by about 90 degrees about the Y-axis via the second rotation axis member 14, so that the line perpendicular to the display 32 and the optical axis of the CCD 41 are in the same direction.

This attitude is the reference attitude for taking photographs with the mobile phone 1. Basically, by taking pictures in this attitude the user can take pictures in the same style as taking pictures with a video camera.

In this reference attitude, no rotation of orientation or any other processing is carried out on the image taken by the CCD 41; the image taken by the CCD 41 is displayed as it is (in FIG. 5, the image (part of an image) taken by the top side of the CCD 41 is displayed in the top side of the display 32, and the image taken by the bottom side of the CCD 41 is displayed in the bottom side of the display 32) in the display 32. In the display 32 in FIG. 5, the cylinder in front of the optical axis that is the subject O is displayed with the top towards the edge 32b of the display 32, and the bottom towards the edge 32d.

Figure 6:
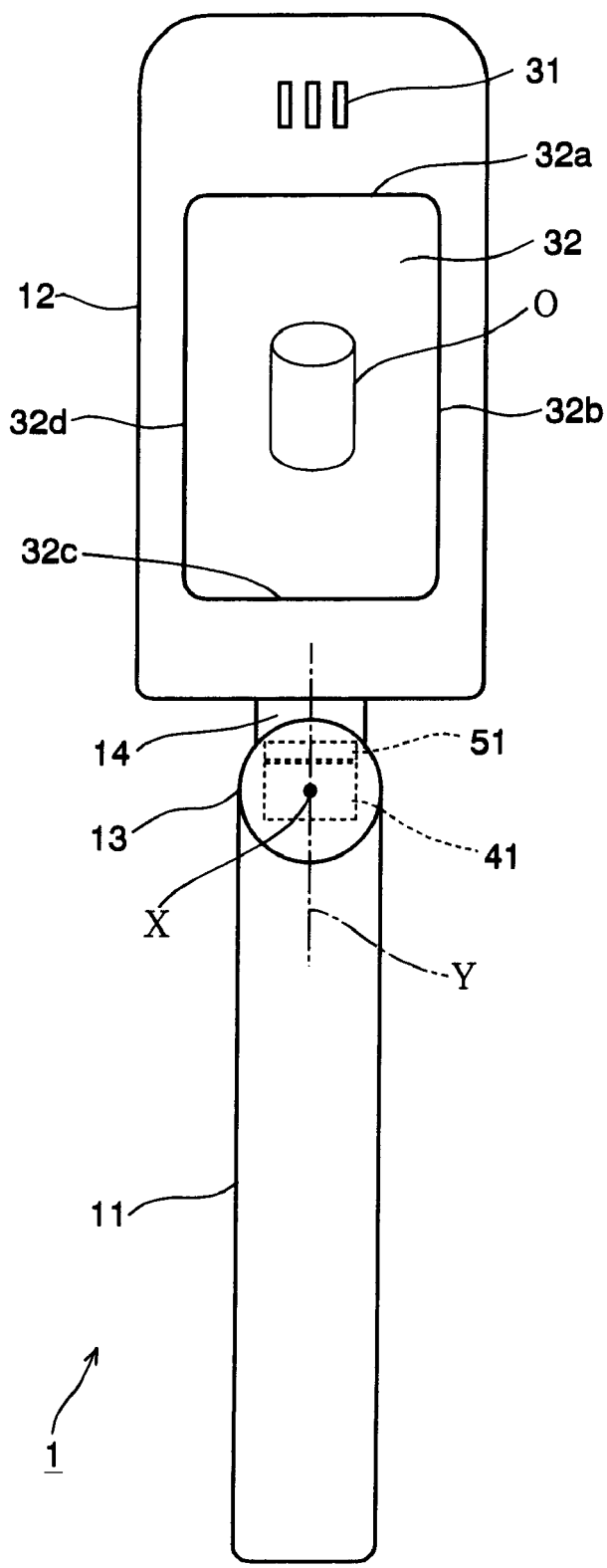
FIG. 6 is another side view of the mobile phone of FIG. 4.

A process for rotating the image taken by the CCD 41 before displaying the image is carried out when the mobile phone 1 is in the attitude shown in FIG. 6, for example.

FIG. 6 shows the mobile phone 1 in an attitude where, from the attitude shown in FIG. 5 the lid 12 is rotated about the X-axis by about 90 degrees, or from the attitude shown in FIG. 4 the lid 12 is rotated about the Y-axis relative to the main body 11 through about 90 degrees, so that the line perpendicular to the display 32 is in the same direction as the optical axis of the CCD 41.

As shown in FIG. 6, when the line perpendicular to the display 32 and the optical axis of the CCD 41 are in the same direction, and the lid 12 is rotated by about 180 degrees relative to the main body 11, the image taken by the CCD 41 is not displayed with its orientation as it is (as in FIG. 5, the top of the subject O is not displayed towards the edge 32b of the display 32, and the bottom is not displayed towards the edge 32d), the image has been rotated through 90 degrees so that the orientation of the subject displayed in the display 32 is the same as the actual orientation of the subject. In FIG. 6, the subject O in front of the optical axis is displayed in the display 32 with the top towards edge 32a and the bottom towards edge 32c.

In this way, a user can accurately confirm the attitude of the subject and the composition of the picture from the image displayed in the display 32 then take the picture. Details of the process in the mobile phone 1 for switching the orientation for displaying the image are explained later by reference to a flowchart.

Figure 7:
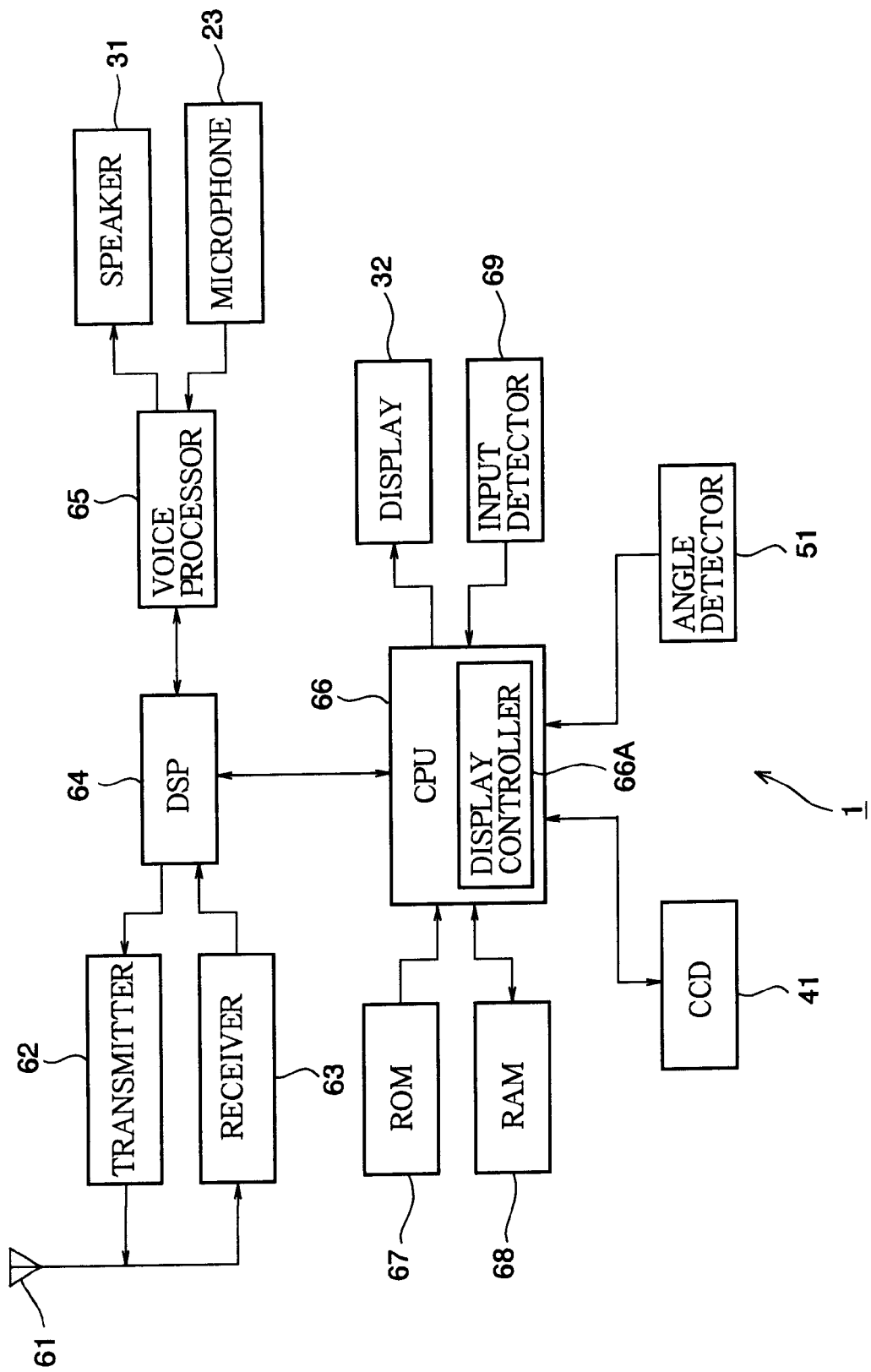
FIG. 7 is a block diagram showing an example of the internal configuration of the mobile phone of FIG. 4.

FIG. 7 is a block diagram showing an example of the internal configuration of the mobile phone 1.

A central processing unit (CPU) 66 expands a control program stored in a read only memory (ROM) 67 into a random access memory (RAM) 68, and the entire operation of the mobile phone 1 is controlled in accordance with the control program. A display controller 66A activated when the control program is executed by the CPU 66 switches the angle of display of the image in the display 32 as appropriate according to the angle of the lid 12 relative to the main body 11 about the X-axis provided by the angle detector 51.

When voice information is provided from a digital signal processor (DSP) 64, a transmitter 62 carries out specific processes such as digital to analog conversion and frequency conversion processes, and transmits the obtained voice signal from an antenna 61 in a specific frequency wireless channel selected by a base station.

A receiver 63, for example in voice conversation mode, carries out specific processes such as amplifying the RF signal received from the antenna 61, frequency conversion process, and an analog to digital conversion process, and outputs the voice information to the DSP 64.

The DSP 64 performs processes such as a spectrum de-spreading process on voice information provided by the receiver 63, and outputs the data obtained to a voice processor 65. Also, the DSP 64 performs a spectrum spreading process on voice information provided by the voice processor 65, and outputs the data obtained to the transmitter 62.

The voice processor 65 converts the user's voice picked up by the microphone 23 into voice information, and outputs the information to the DSP 64. Also, the voice processor 65 converts voice information provided by the DSP 64 into an analog voice signal, and outputs the corresponding voice signal to the speaker 31.

The display 32 displays the appropriate screen based upon information provided by the CPU 66. An input detector 69 detects inputs from a user via the operation key 21 or input buttons 22 provided on the main body 11, and outputs the corresponding signal to the CPU 66.

The CCD 41 takes pictures in accordance with control from the CPU 66, and outputs the image data of the subject to the CPU 66. The image data taken is stored in internal flash memory, or in flash memory in a memory card (neither are shown on the drawings) that can be inserted into and removed from the mobile phone 1, or similar.

The angle detector 51 measures the rotation angle of the lid 12 relative to the main body 11 about the X-axis, and outputs the measured angle information to the CPU 66.

Figure 8:
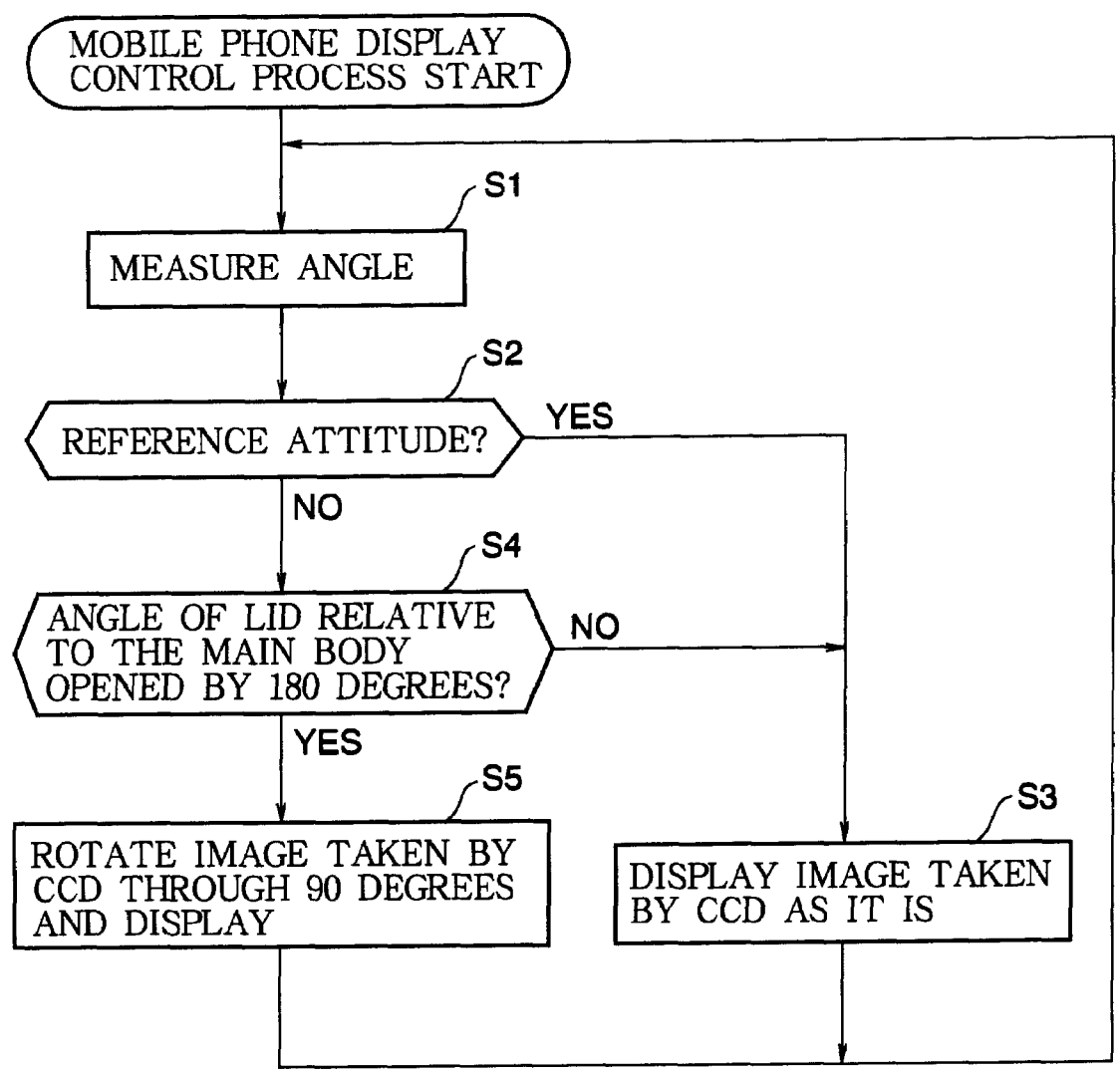
FIG. 8 is flowchart explaining the display control process of the mobile phone of FIG. 4.

Next, the display control process carried out by a mobile phone 1 having the above configuration will be explained with reference to the flowchart in FIG. 8.

This process is carried out when the orientation of the line perpendicular to the display 32 is the same as that of the optical axis of the CCD 41, and the attitude is in the camera mode (picture taking mode), as shown in FIG. 5 or 6. When in camera mode, the image taken by the CCD 41 is displayed in the display 32.

In step S1, the angle detector 51 measures the rotation angle of the lid 12 relative to the main body 11 about the X-axis in FIG. 4. The angle detector 51 outputs the measured rotation angle information to the CPU 66.

In step S2, the CPU 66 determines based upon the information provided by the angle detector 51 whether the attitude of the mobile phone 1 is in the attitude of the standard picture taking style or not, in other words, whether the lid 12 is rotated approximately 90 degrees about the X-axis relative to the main body 11, as shown in FIG. 5.

In step S2, if the CPU 66 determines that the mobile phone 1 is in the attitude of the standard picture taking style, the process proceeds to step S3, and the image taken by the CCD 41 is displayed on the display 32 without rotating the orientation by the display controller 66A. Therefore, when there is a cylindrical main body as the subject O in front of the optical axis of the CCD 41 (when the cylinder is in an upright attitude), the subject O is displayed with the top towards edge 32b of the display 32 and the bottom towards edge 32d.

Thereafter the process returns to step S1, and the process is repeated.

On the other hand, in step S2, if it is determined that the mobile phone 1 is not in the attitude of the standard picture taking style because the lid 12 is not rotated about the X-axis by about 90 degrees relative to the main body 11, the CPU 66 proceeds to step S4.

In step S4, the CPU 66 determines whether the lid 12 is opened relative to the main body 11 by about 180 degrees, in other words determines whether the attitude is as shown in FIG. 6, and if it is determined that the mobile phone 1 is not in this attitude the process proceeds to step S3, and the image taken by the CCD 41 is displayed as it is in the display 32. Therefore, the display of the subject O as shown in FIG. 5 is maintained.

When the CPU 66 determines in step S4 that the lid 12 is opened by about 180 degrees relative to the main body 11, that the mobile phone 1 is in the attitude shown in FIG. 6, the process proceeds to step S5, and the image taken by the CCD 41 is rotated through 90 degrees and displayed on the display 32. Therefore at this time the subject O in front of the optical axis of the CCD 41 is displayed with the top towards edge 32a of the display 32 and the bottom towards edge 32c. The image of the subject O displayed in the display 32 in FIG. 6 is rotated by 90 degrees compared with that of FIG. 5.

Then the process returns to step S1, and thereafter the process is repeated.

According to the above process, the orientation of the displayed image is switched as appropriate so that the orientation of the image of the subject O is the same as the actual orientation of the subject O. Therefore, from the image displayed in the display 32, a user can accurately confirm the attitude of the subject at that time.

In the above, the orientation of the image is switched only when the lid 12 is opened relative to the main body 11 by about 180 degrees, but the image may be always switched so that the orientation of the image of the subject O is the same as the actual orientation of the subject O.

Figure 9:
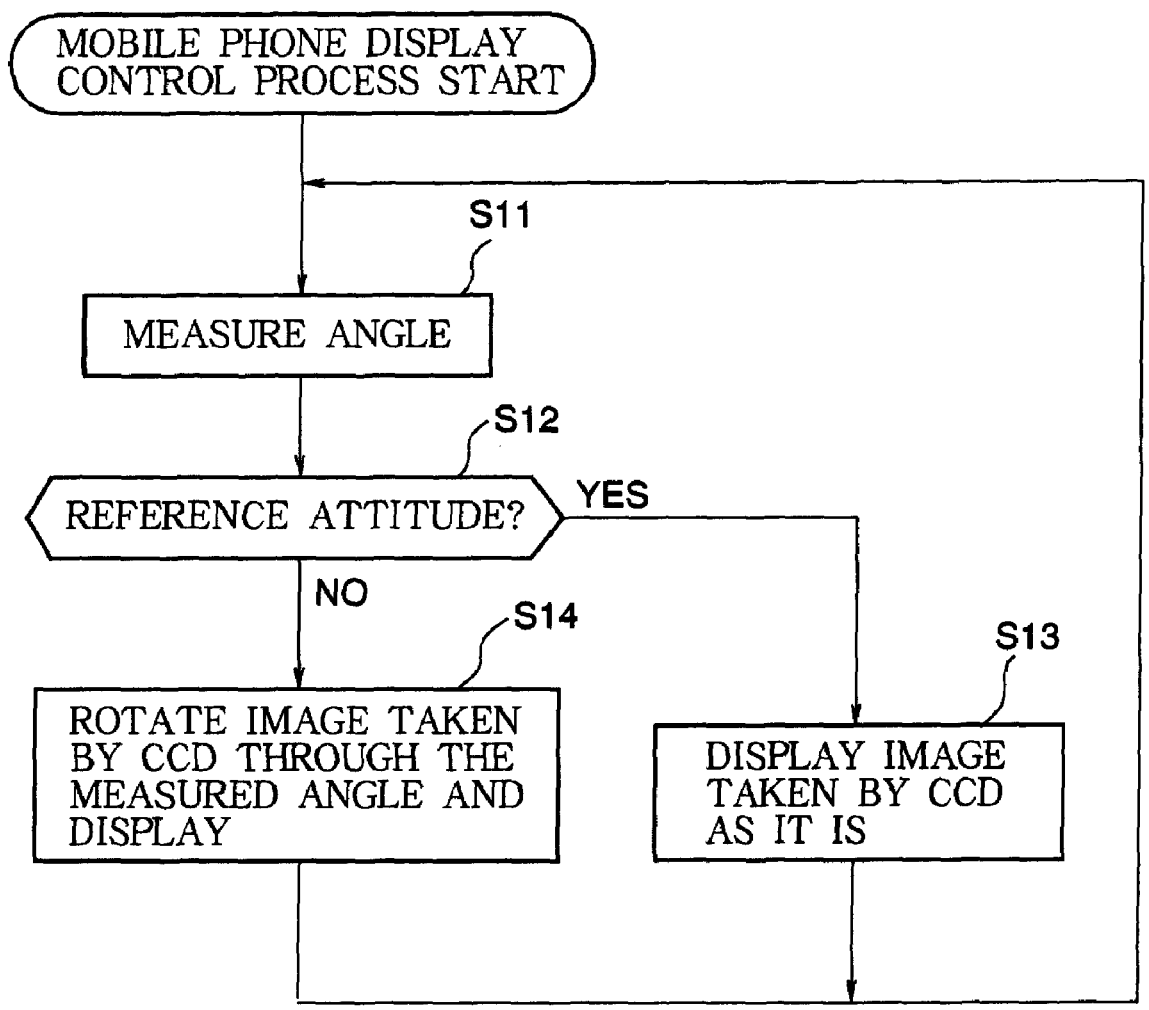
FIG. 9 is flowchart explaining another display control process of the mobile phone of FIG. 4.

Next, a display control process in which the image display is always controlled in accordance with the rotation angle that is detected at predetermined intervals is explained, with reference to the flowchart in FIG. 9.

In step S11, the angle detector 51 measures the rotation angle of the lid 12 relative to the main body 11 about the X-axis, and outputs the measured rotation angle to the CPU 66.

In step S12, the CPU 66 determines based upon the information provided by the angle detector 51 whether the attitude of the mobile phone 1 is in the attitude of the standard picture taking style or not, and if it is determined that the attitude is the standard picture taking style, the process proceeds to step S13.

In step S13, the display controller 66A displays the image taken by the CCD 41 on the display 32 as it is, and thereafter the process from step S11 is repeated. In this case the image of the subject O is displayed in the display 32 with the top towards edge 32b and the bottom towards edge 32d.

On the other hand, in step S12, if it is determined that the mobile phone 1 is not in the attitude of the standard picture taking style, the CPU 66 proceeds to step S14, rotates the image taken by the CCD 41 in accordance with the rotation angle measured by the angle detector 51, and displays the image in the display 32. Then the process returns to step S11, and thereafter the process is repeated.

Figure 10A:
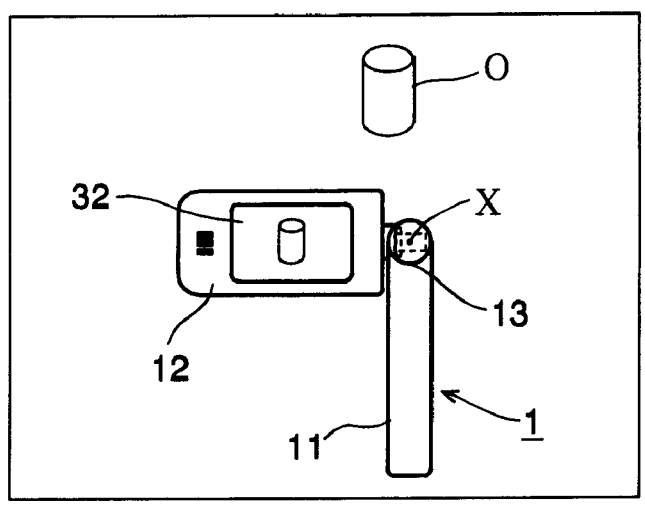
FIG. 10A shows an example of the display of an image taken by the mobile phone of FIG. 4.
Figure 10B:
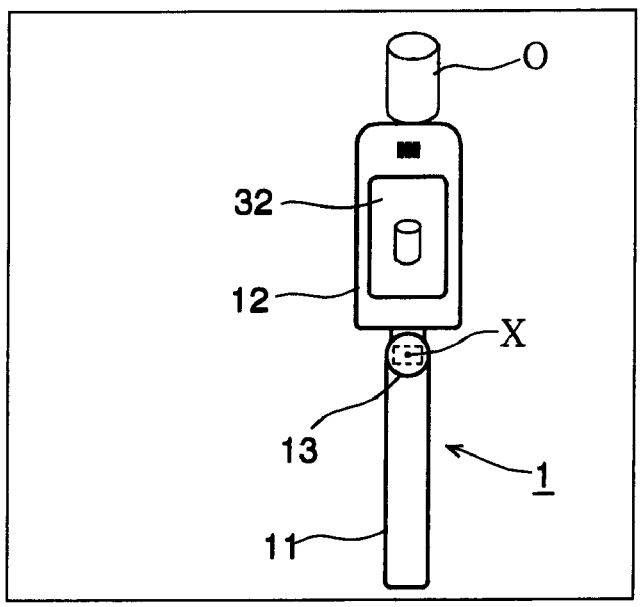
FIG. 10B shows an example of the display of an image taken by the mobile phone of FIG. 4.

According to this process, if for example the attitude is changed from the standard picture taking style shown in FIG. 10A to an attitude in which the lid 12 is opened by about 180 degrees relative to the main body 11 as shown in FIG. 10B, the image taken by the CCD 41 is rotated by 90 degrees and displayed in the display 32. In other words, if the positional relationship of the lid 12 and main body 11 is changed by 90 degrees from the attitude shown in FIG. 10A, the image is also rotated by 90 degrees and displayed.

Figure 10C:
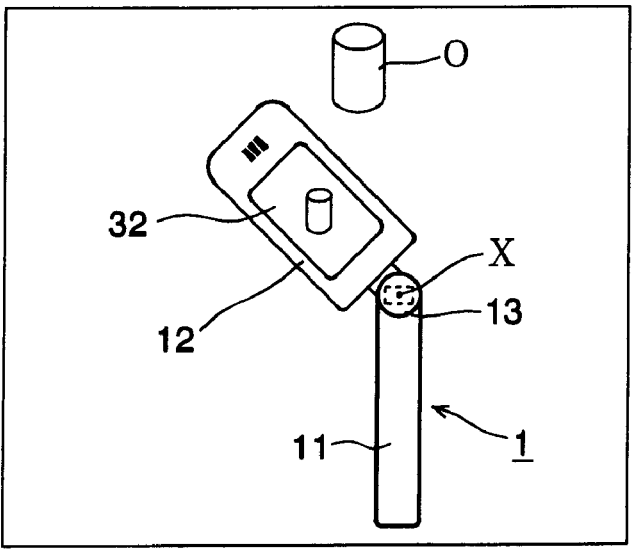
FIG. 10C shows an example of the display of an image taken by the mobile phone of FIG. 4.

Also, when the positional relationship of the lid 12 and the main body 11 is changed by 45 degrees from the attitude shown in FIG. 10A, as shown in FIG. 10C (the lid 12 is opened by about 135 degrees relative to the main body), the image is also rotated by 45 degrees and displayed.

In this way, by displaying the image rotated every time in accordance with the rotation angle measured at predetermined frequencies, the situation where the orientation of the image of a subject is the same as the actual orientation of the subject can be always maintained.

In the above, the rotation angle of the lid 12 relative to the main body 11 about the X-axis is measured, and the display of the image is switched by software in accordance with the measurement result, however the image display can also be switched by rotating the CCD 41 itself in response to the rotation of the main body 11 and the lid 12.

Embodiment 2

Figure 11:
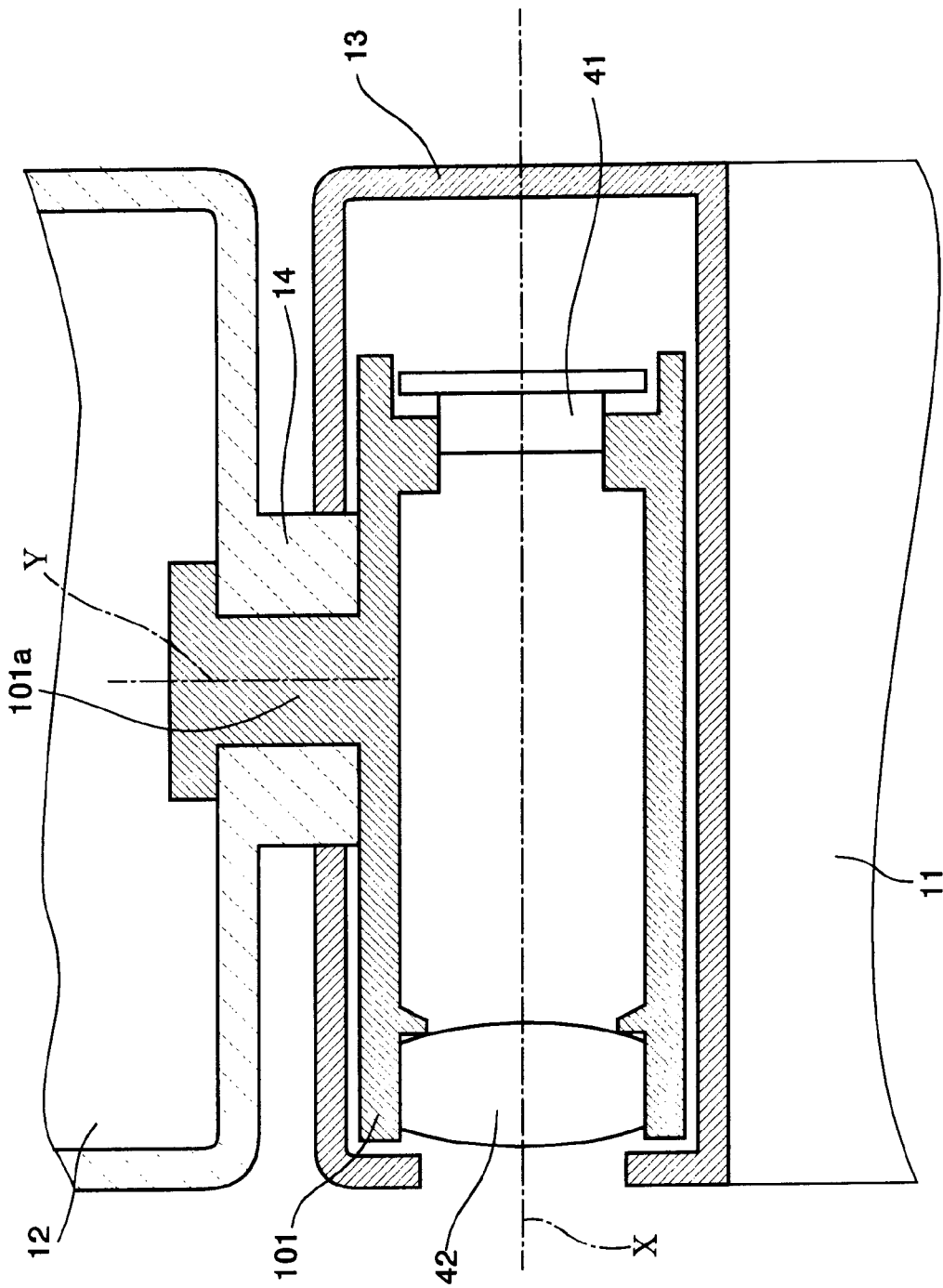
FIG. 11 is a cross-section view of another mobile phone according to the present invention.

FIG. 11 is a cross-section view of a mobile phone 1 having a configuration in which a CCD 41 is rotated in response to the rotation of a lid 12 relative to a main body 11, near a first rotation axis unit 13.

An imaging block 101 that holds a CCD 41 and a lens 42 is provided within the first rotation axis unit 13. The imaging block 101 can rotate as a whole about the X-axis.

A projection 101a formed in the imaging block 101 passes through a second rotation axis member 14 and mates with the lid 12, so that the imaging block rotates as a whole in response to rotation of the lid 12 about the X-axis relative to the main body 11. When the imaging block 101 rotates, the CCD 41 and lens 42 housed in the imaging block 101 also rotate in response.

The projection 101a and the second rotation axis member 14 are not fixed; rotation about the Y-axis is possible. In other words, when external force is applied to the lid 12 to rotate the lid 12 about the Y-axis, the main body 11, the first rotation axis unit 13, and the imaging block 101 within the first rotation axis unit 13 maintain the attitude as shown in FIG. 11, and only the lid 12 rotates in accordance with the applied external force.

Figure 12:
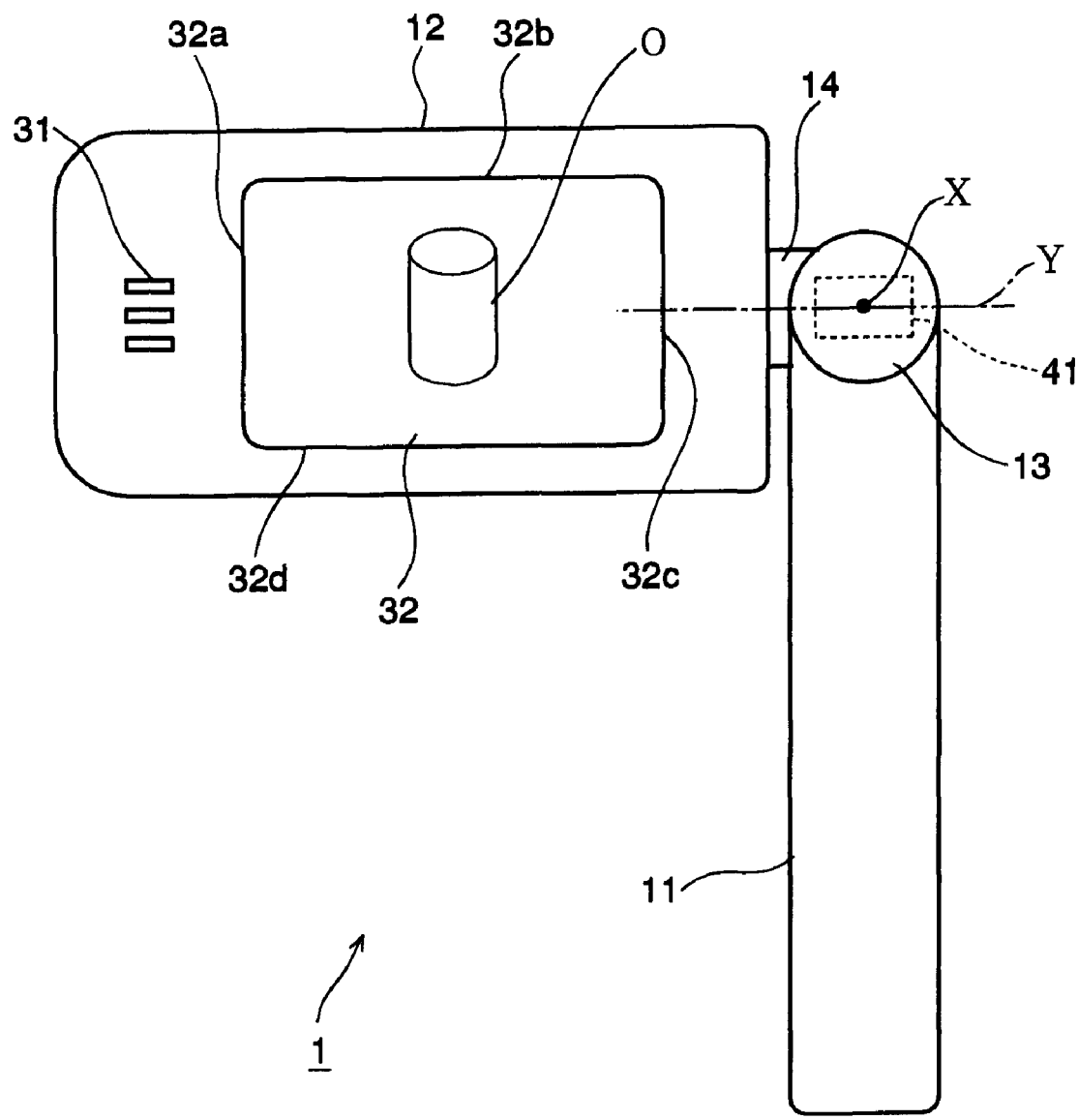
FIG. 12 is a side view of a mobile phone having the configuration of FIG. 11.
Figure 13:
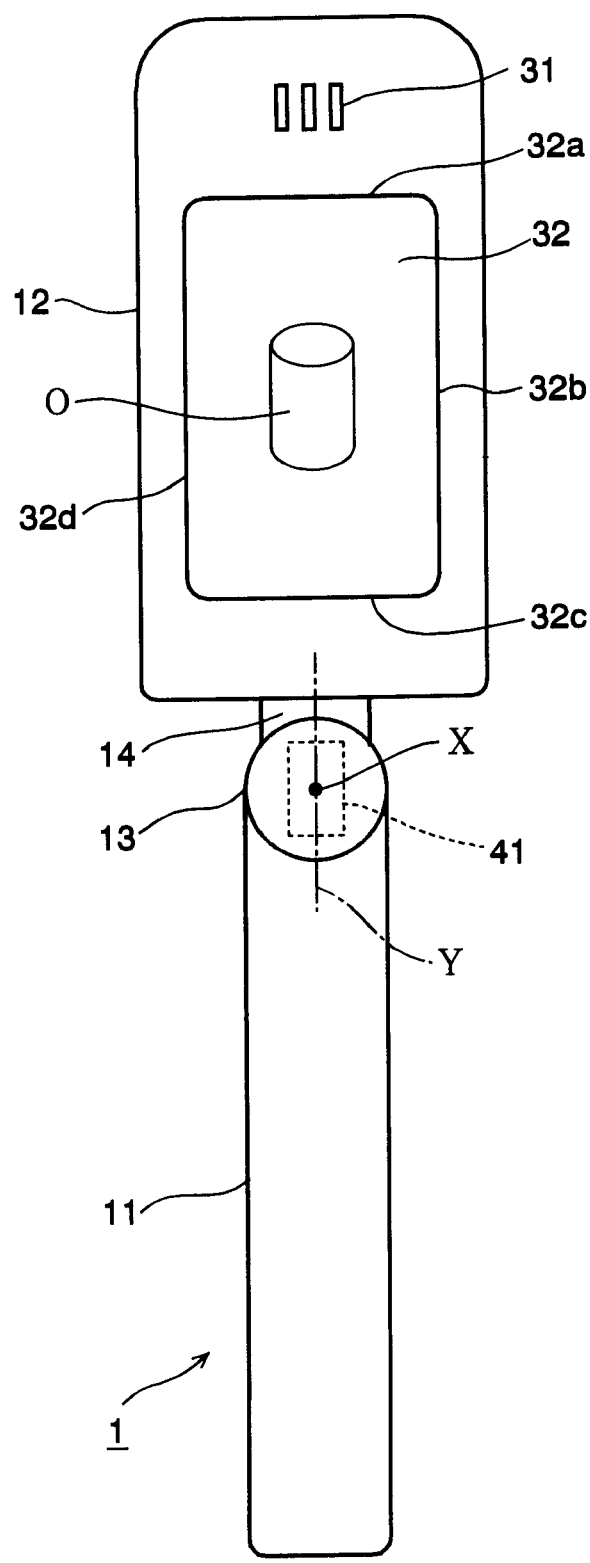
FIG. 13 is another side view of a mobile phone having the configuration of FIG. 11.

In this way, an imaging block 101 is provided in which the CCD 41 and other components rotate about the X-axis in response to rotation of the imaging block 101, so if for example the position of the lid 12 relative to the main body 11 is changed from the reference attitude shown in FIG. 12 to the attitude in FIG. 13, the orientation of the CCD 41 rotates in response to this rotation. In other words, in FIG. 12 the long direction of the CCD 41 is in the horizontal direction of the figure, but in FIG. 13 in response to the rotation of the lid 12 about the X-axis, the entire CCD 41 rotates so that the long direction of the CCD 41 is in the vertical direction of the figure.

As a result of this, by just displaying the image taken by the CCD 41 as it is in the display 32, without carrying out any process such as rotating the orientation, the orientation of the image of the subject O can be made to be always the same as that of the subject O. As a result of this also, a user can accurately confirm the attitude of the subject and the composition of the picture from the display on the display 32.

In the above, switching (rotation) of the orientation of a displayed image and rotation of the entire CCD 41 was carried out in a mobile phone, however these processes (rotation of the image, rotation of the CCD) can be carried out not only in a mobile phone but in any terminal having a configuration in which a main body and a lid can rotate in two axes and the picture taking element is provided within an axis. Besides a mobile phone, the terminal can be for example a Personal Digital Assistant (PDA) or a notebook type personal computer.

The invention claimed is:

1. A mobile phone equipped with a camera, comprising:
a first rotation axis unit that supports a lid and a main body pivotally;
an image taking device whose optical axis has the same orientation as the rotation axis of the first rotation axis unit, and which is provided fixedly inside the first rotation axis unit;
a display panel, provided on the lid, for displaying an image taken by the image taking device;
a second rotation axis unit that supports the lid pivotally with respect to the main body about an axis perpendicular to the axis of the first rotation axis unit;
an angle measuring device that measures a rotation angle of the first rotation axis unit; and
a display control circuit that is operable to rotate the image taken by the image taking device according to the rotation angle measured by the angle measuring device and displays the image taken by the image taking device in the display panel in such a manner that an up-and-down direction of an object in the image displayed in the display panel coincides with an actual up-and-down direction of the object at a time when a direction perpendicular to a surface of the display panel is the same as a direction of the optical axis,
wherein a reference attitude is set as an attitude at which the direction perpendicular to the surface of the display panel and the direction of the optical axis become the same direction, by rotation of the lid substantially ninety degrees about the rotation axis of the first rotation axis unit and substantially ninety degrees about the rotation axis of the second rotation axis unit relative to the main body, and wherein the display control circuit causes the image taken by the image taking device to be displayed as-is on the display panel when in the reference attitude, and rotates the image taken by the image taking device and displays the rotated image on the display panel when not in the reference attitude.

* * * * *